(12) United States Patent
Edenfeld

(10) Patent No.: US 8,344,533 B2
(45) Date of Patent: Jan. 1, 2013

(54) USE OF PITCH BATTERY POWER TO START WIND TURBINE DURING GRID LOSS/BLACK START CAPABILITY

(75) Inventor: Thomas Edenfeld, Osnabrück (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/194,233

(22) Filed: Jul. 29, 2011

(65) Prior Publication Data

US 2011/0291416 A1    Dec. 1, 2011

Related U.S. Application Data

(62) Division of application No. 12/174,113, filed on Jul. 16, 2008, now Pat. No. 8,008,794.

(51) Int. Cl.
*H02P 9/00* (2006.01)
*H02P 9/48* (2006.01)

(52) U.S. Cl. ............................................. 290/44; 322/37
(58) Field of Classification Search ............ 290/43, 290/44, 54, 55; 322/37, 44
See application file for complete search history.

(56) References Cited

U.S. PATENT DOCUMENTS

| | | | |
|---|---|---|---|
| 7,282,807 B2 | 10/2007 | Hornemann et al. | |
| 7,425,771 B2 | 9/2008 | Rivas et al. | |
| 7,566,981 B2 | 7/2009 | Kunkel et al. | |
| 7,569,944 B2 | 8/2009 | Oohara et al. | |
| 7,736,127 B1 | 6/2010 | Carr | |
| 7,750,490 B2 | 7/2010 | Scholte-Wassink | |
| 7,755,210 B2 | 7/2010 | Kammer et al. | |
| 7,786,608 B2 | 8/2010 | Menke | |
| 8,008,794 B2 * | 8/2011 | Edenfeld | 290/44 |
| 2004/0145188 A1 | 7/2004 | Janssen et al. | |

FOREIGN PATENT DOCUMENTS

| | | |
|---|---|---|
| DE | 10 2005 030 709 A1 | 1/2007 |
| EP | 1 323 222 A1 | 7/2003 |
| EP | 1 748 183 A1 | 1/2007 |
| EP | 1 832 743 A1 | 9/2007 |
| EP | 1 903 213 A1 | 3/2008 |
| WO | 02/21661 A1 | 3/2002 |

OTHER PUBLICATIONS

Search Report issued in connection with EP Patent Application No. 09165355.0, Mar. 6, 2012.

* cited by examiner

*Primary Examiner* — Nicholas Ponomarenko
(74) *Attorney, Agent, or Firm* — Global Patent Operation; Douglas D. Zhang

(57) ABSTRACT

A method of operating a wind power plant during grid loss is disclosed. The method includes powering a blade pitch drive of the wind power plant by an energy storing unit, and adjusting the pitch of the rotor blades of the wind power plant by means of the blade pitch drive, wherein a rotor shaft keeps rotating and the wind power plant enters a self-sustaining power generating mode upon adjustment of the pitch of the blades.

7 Claims, 2 Drawing Sheets

USE OF PITCH BATTERY POWER TO START WIND TURBINE DURING GRID LOSS/BLACK START CAPABILITY

CROSS-REFERENCE TO RELATED APPLICATIONS

This is a divisional application of and claims priority of U.S. patent application Ser. No. 12/174,113, filed Jul. 16, 2008, now U.S. Pat. No. 8,008,794, the entirety of which is incorporated herein by reference.

BACKGROUND

The present disclosure relates to wind turbines and wind power plants. Particularly, the disclosure relates to a wind power plant and a method of operating thereof during a grid loss.

Wind power plants and farms of wind power plants have to cope with high dynamics of wind speeds and need to be capable of handling non-normal situations such as grid loss. Usually when a grid loss occurs, the wind power plant immediately enters an emergency exit power down mode which causes the wind power plant to rotate its rotor blade out of the wind such that the rotor decelerates and comes to a halt in a controlled way. The energy for actuating the rotor blades is taken from so called pitch batteries or pitch accumulators which are large enough to enter the safe standstill and complete the power down maneuver.

SUMMARY

In view of the above, according to one embodiment, a wind power plant is provided. The wind power plant comprises a plurality of rotor blades, a blade pitch drive, a rotor shaft, an electric generator, a control unit adapted to control the operations of the wind power plant, and an energy storing unit coupled to the blade pitch drive, wherein the plurality of rotor blades is rotatably connected to the rotor shaft, the blade pitch drive, under the control of the control unit, is adapted to adjust the pitch of the rotor blades, the rotor shaft is operatively connected to the electric generator for generating electric energy, and the control unit comprises a control module adapted to adjust the rotor blades to enter a self-sustaining mode of operation of the wind power plant.

In view of the above, a further embodiment relates to a method of operating a wind power plant during grid loss. The method comprises powering a blade pitch drive of the wind power plant by an energy storing unit and adjusting the pitch of the rotor blades of the wind power plant by means of the blade pitch drive, wherein a rotor shaft starts rotating upon adjustment of the pitch of the blades.

In view of the above, a further embodiment relates to a method of operating a wind power plant during grid loss. The method comprises powering a blade pitch drive of the wind power plant by an energy storing unit and adjusting the pitch of the rotor blades of the wind power plant by means of the blade pitch drive, wherein a rotor shaft keeps rotating and the wind power plant enters a self-sustaining power generating mode upon adjustment of the pitch of the blades.

According to a further embodiment, a computer-readable storage device is provided. The computer-readable storage device comprises a program storage space with a program comprising the program instructions to detect grid availability, to change an operation mode of the wind power plant from a normal mode to a self-sustaining mode if the grid becomes unavailable or from self-sustaining mode to normal mode if the grid becomes available, to power a blade pitch drive of the wind power plant after change of operation mode, to adjust the pitch of the blades by means of the blade pitch drive, wherein a rotor shaft of the wind power plant starts rotating upon adjustment of the blades if the operation mode is changed to self-sustaining mode.

According to a yet further embodiment, a computer-readable data stream is provided. The computer-readable data stream comprises program instructions to detect grid availability, to change an operation mode of the wind power plant from a normal mode to a self-sustaining mode if the grid becomes unavailable or from self-sustaining mode to normal mode if the grid becomes available, to power a blade pitch drive of the wind power plant after change of operation mode, to adjust the pitch of the blades by means of the blade pitch drive, wherein a rotor shaft of the wind power plant starts rotating upon adjustment of the blades if the operation mode is changed to self-sustaining mode.

Further embodiments, aspects, advantages and features, which can be applied individually or in any suitable combination, are apparent from the dependent claims, the description and the accompanying drawings. A full and enabling disclosure including the best mode, to one of ordinary skill in the art, is set forth more particularly in the remainder of the specification, including reference to the accompanying figures.

BRIEF DESCRIPTION OF THE DRAWINGS

So that the manner in which the above recited features of the present disclosure can be understood in detail, a more particular description, briefly summarized above, may be had by reference to embodiments. The accompanying drawings relate to embodiments and are described in the following.

DETAILED DESCRIPTION

Reference will now be made in detail to the various embodiments, one or more examples of which are illustrated in the figures. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

Figure 1:
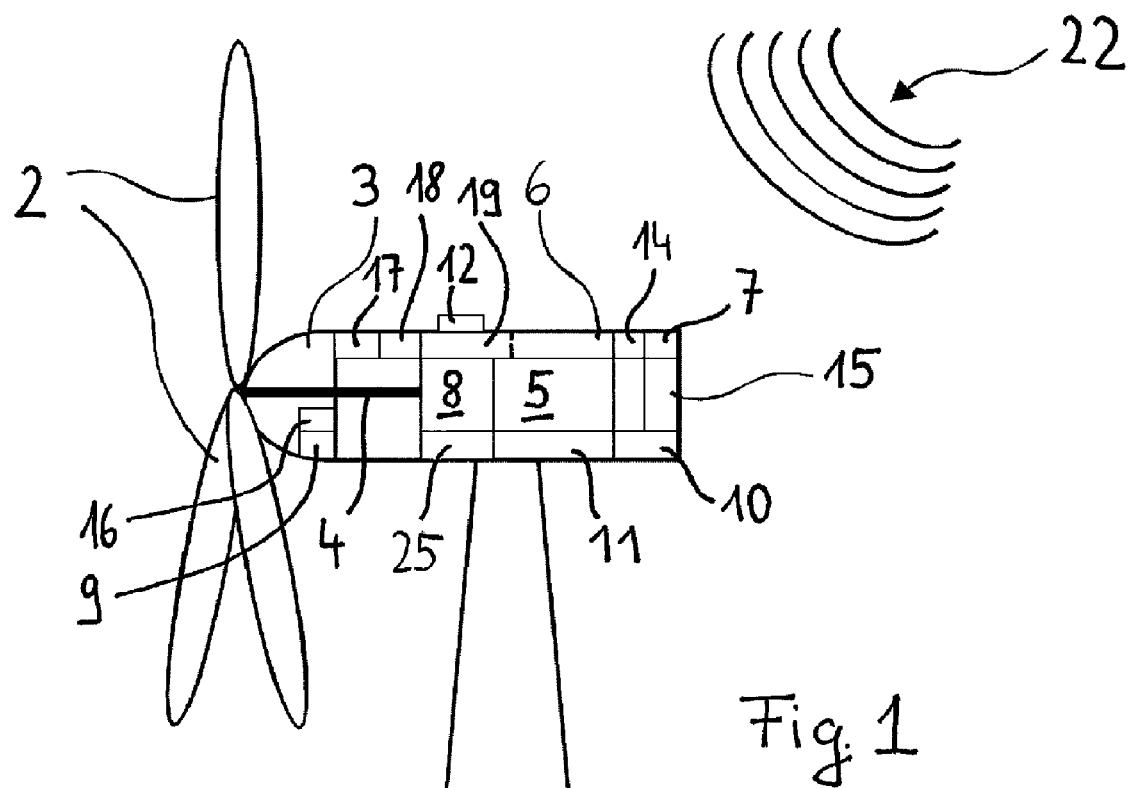
FIG. 1 shows a schematic lateral view of a wind power plant including a grid loss/black start capability.
Figure 1:
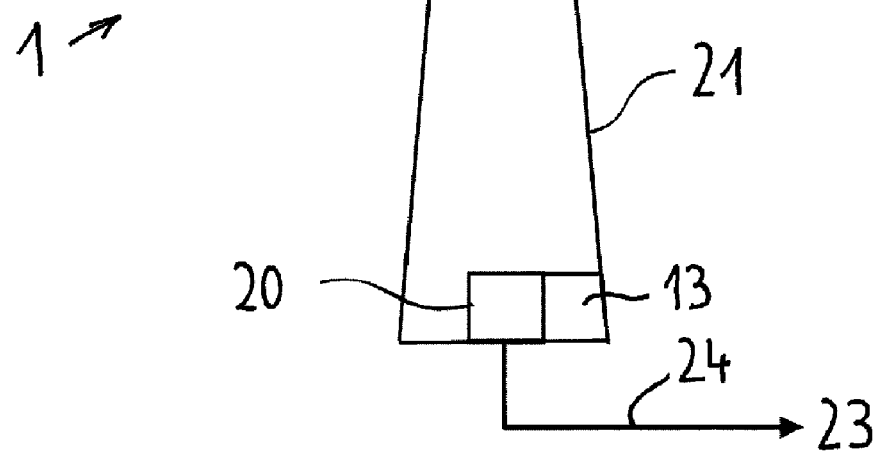

Further aspects and advantageous developments which can be combined in any suitable manner with the other aspects as described in this application, the specification and the claims, are described in view of FIG. 1 showing a schematic drawing illustrating a wind power plant including a grid loss/black start capability.

FIG. 1 schematically shows a wind power plant 1 having an electric generator 5 being driven by wind 22 that forces rotor blades 2 to rotate with a rotor shaft 4. The electric generator 5 is located in a nacelle and is fixed to a top of a tower 21. The rotor shaft 4 is rotatably connected to the electrical generator 5 with a gear box 8. The electric power generated by the electric generator 5 is rectified by rectifier 10 and converted by converter 11 to an AC power which is transformed by a transformer 20 and is fed into the external grid 23 with a power line 24.

Operation of the wind power plant 1 is controlled by a control unit 6 which includes a control module 7. The control unit 6 may be a central control unit. The control unit may include a circuit. The control unit may include any piece or pieces of hardware or software, such as computers and computer programs, to control the wind power plant. The control module 7 controls a blade pitch drive 3 of the rotor blades 2. The blade pitch drive 3 can adjust the pitch angle of the rotor blades, the pitch angle typically being adjustable between 0° and 90°. In case of a grid loss the blade pitch drive 3 adjusts the rotor blades 2 such that the rotor shaft 4 keeps rotating and the electric generator 5 generates enough energy for sustaining a self-sustaining mode of operation of the wind power plant and for lubricating the bearings of the wind power plant 1. Specifically, auxiliary components 12 such as safety lights at the top of the tower 21 and cooler 25 for cooling temperature sensitive components of the wind power plant 1 are provided with the necessary electric power. The auxiliary components may be other auxiliary consumers, e.g. heaters to avoid humidity inside electrical cabinets, yaw drives, battery chargers, or other devices.

As shown in FIG. 1, the wind power plant 1 further comprises a detector module 13 for detecting a grid loss. A grid loss is detected if the grid is completely unavailable, possibly for a prolonged period of time. Alternatively, a grid loss is detected if the grid is unstable, and, possibly, the connection via power line 24 cannot be upheld. In case a grid loss is detected, the control unit 6 switches is to a self-sustaining mode of operation which keeps the rotor shaft 4 rotating such that enough electric energy is generated and bearing of a wind power plant 1 are kept lubricated. In some embodiments, switching is effected if the grid loss, i.e., the voltage down time, is longer than the Low Voltage Ride Through (LVRT) capability or the Zero Voltage Ride Through (ZVRT) capability of a turbine of the wind power plant. Typically, switching is effected if the grid loss is longer than 5 seconds. Switching may be effected if the grid loss is longer than 1 second. The blade pitch drive 3 is powered by an energy storing unit 9 which is recharged by the energy as generated may by electric generator 5. The energy storing unit 9 further comprises a spring module 17 and a pressure vessel 18 for storing mechanical energy in addition to the electric energy.

In case of a grid loss and low wind speeds a portion 19 of the control unit 6 may be placed in standby or sleep mode in order to save energy of the energy storing unit 9. Once wind speeds pick up, a wake-up module 15 wakes up the portion 19 of the control unit 6 such that the wind power plant 1 can resume its self-sustaining mode of operation. The energy storing unit comprises preferably a rechargeable battery having an energy capacity of 15 kWh. A charging level detector 16 measures the energy level of the energy storing unit 9, in order to make sure that there is always enough remaining energy to bring the wind power plant 1 into standstill safely. After a grid loss a switching module 14 detects a resuming grid and initiates that the wind power plant 1 switches over from the self-sustaining mode of operation to a normal mode of operation.

According to an embodiment, a wind power plant 1 is provided. The wind power plant 1 comprises a plurality of rotor blades 2, a blade pitch drive 3, a rotor shaft 4, an electric generator 5, and a control unit 6 for controlling the operations of the wind power plant 1. The plurality of rotor blades 2 are rotatably connected to the rotor shaft 4, such that the pitch of the rotor blades 2 can be adjusted by the blade pitch drive 3 under the control of the control unit 6. The rotor shaft 4 is operatively connected to the electric generator 5 for generating electric energy. The wind power plant 1 further comprises an energy storing unit 9 for powering the blade pitch drive 3, wherein the control unit 6 comprises a control module 7 for adjusting the rotor blades 2 and for entering a self-sustaining mode of operation of the wind power plant 1.

With the self-sustaining mode of operation basic functions of the wind power plant 1, in particular safety and security functions as well as lubrication of the rotatable parts 2, 3, 4, 5, 8 of the wind power plant 1 are sustained even for long periods of a grid loss.

By means of the rotor blades and the generator a portion of the wind inherent kinetic energy is converted into at least one second form of energy. The at least one second form of energy may be potential energy, e.g. potential energy in a medium for later use. The at least one second energy may be another form of energy for later use. Typically, the at least one second energy is electric energy or mechanical energy. Further, the at least one second form of energy is typically stored, e.g. in form of electric and/or mechanical energy. The at least one second form of energy is typically stored for retrieval at a later period of time.

In order to cope with different wind speeds, the respective rotor blades are adjustably connected to the rotor shaft such that their blade pitch may be adjusted suitably by rotating the rotor blades about their longitudinal axes. The plurality of rotor blades are operatively connected to the electric generator using a wind turbine drive train which may or may not perform a frequency conversion of the rotating rotor shaft to a higher rotational frequency in order to optimally operate the generator.

During a black start or for starting the wind power plant during a grid loss, the turbine controller first opens the connection to the grid by switching off the medium voltage switch gear. If the turbine controller detects that the grid has recovered, the turbine controller synchronizes the turbine voltage, by means of the AC/DC/AC converter, to the grid voltage and closes the medium voltage switch gear to change over to normal operation.

During a black start or for starting the wind power plant during a grid loss, the control module is capable of adjusting the rotor blades such that the rotor shaft starts rotating. Thus, contrary to conventional procedures where after grid loss the rotor shaft is immediately decelerated and brought to rest, the control module adjusts the rotor blades for entering a self-sustaining mode of operation of the wind power plant, wherein the rotor of the wind power plant continues to rotate and the wind power plant generates enough energy for sustaining its functions such as keeping its security lights on or operating its ventilators for cooling its temperature sensitive components and for providing enough energy such that the wind power plant can resume its normal operation function anytime without requiring initial electric energy from the grid. There may be more functions for which the wind power plant generates enough energy in self-sustaining mode, e.g. heating devices, yaw drives, battery chargers or other components that may draw power from a grid, including those that may be developed in the future.

As the self-sustaining mode of operation keeps the rotor shaft rotating, according to the embodiment, lubrication of the bearings and/or the rotor shaft is maintained which reduces wear and increases the expected lifetime of the wind power plant.

In an embodiment, the energy storing unit may store energy between 5 kWh and 100 kWh, in particular in between 10 kWh and 30 kWh. These energy ranges are illustrative and may vary depending on the size or rating of the wind power plant or of the wind turbine.

In a further embodiment, the power necessary for sustaining the self-sustaining mode is between 10 kWh and 40 kWh.

This energy range is illustrative and may vary depending on the size or rating of the wind power plant or of the wind turbine.

In an embodiment, the energy storing unit is for storing electric energy. The energy storing unit is maybe a rechargeable battery or accumulator.

In a further embodiment, the wind power plant further comprises a rectifier for rectifying the output of the electric generator, and a converter for DC-AC converting the rectified output, wherein the energy storing unit is connected to the rectified output. The rectifier and the converter for DC-AC converting the rectified output may be comprised in an AC/DC/AC converter.

In an embodiment, the electric energy storing unit is placed between the rectifier and the converter such that the energy storing unit may easily be recharged during times when there is enough wind.

In a further embodiment, the electric storing unit may be an electric capacitor.

In yet a further embodiment, the energy storing unit is for storing mechanical energy. For example the energy storing unit may comprise a spring module for storing mechanical energy. Alternatively or in addition the energy storing unit comprises a pressure vessel for storing energy by pressurizing a fluid such as a gas or a liquid.

In a further embodiment, the wind power plant comprises auxiliary components and circuitry for providing electric energy of the energy storing unit to the auxiliary components. Auxiliary components may be consumers of electric energy such as safety lights at the top of the tower or a cooler for cooling temperature sensitive components of the wind power plant. Alternatively, auxiliary components may be of a different kind.

In a yet further embodiment, the control module further comprises a detector module for detecting when a currently generated power level drops below a power threshold necessary for keeping the self-sustaining mode of operation of the wind power plant. The detector module detects a currently generated power and once the power level drops below a power threshold, either the blade pitch is adjusted so as to resume the self-sustaining mode of operation of the wind power plant, or, the wind power plant is put to rest. Time scale for measuring the currently generated power may be between 1 minutes and 2 hours, such as between 10 minutes and 60 minutes.

If wind speeds pick up after a time of calm, and the speeds are high enough to enter the self-sustaining mode of operation, the wind power plant can be brought back into the self-sustaining mode in order to generate the energy for recharging the energy storing unit and to generate the energy that is necessary for keeping the minimum functions running such as operating the security lights, cooling, control etc. For this purpose the turbine controller may first open the connection to the grid by switching off the medium voltage switch gear. If the turbine controller detects that the grid has recovered, the turbine controller may then synchronize the turbine voltage, by means of the AC/DC/AC converter, to the grid voltage and close the medium voltage switch gear to change over to normal operation.

In a further embodiment, the control unit further comprises a switching module for detecting a resuming grid and for changing the self-sustaining mode of operation into a normal mode of operation of the wind power plant. The switching module controls the synchronization of the wind power plant with the external grid and controls the matching between the two.

In a further embodiment, the wind power plant comprises a wake-up module. The wake-up module serves to wake up the wind power plant after calm or a period where wind speeds are too low to sustain the self-sustaining mode of operation during a period of grid loss, when the central control has been put on standby or in sleep mode. If wind speeds pick up and exceed a minimum threshold necessary for keeping the self-sustaining mode, the wake-up module wakes up the control unit in order to resume a self-sustaining mode of operation. The purpose of the sleep mode of a control unit is to save energy of the energy storing unit during times when the wind speeds are too low to generated enough power and when there is no external grid. With help of the wake-up module the standby or sleep mode of the central control can be finished, when wind speeds have sufficiently increased and the central control can resume its self-sustaining mode of operation. Once the wake-up module has powered up the central control, the wind power plant can perform a black start in order to generate power and recharge the energy storing unit. The wake-up module can be designed as a small control logic having a power consumption being much smaller than the one of the control unit.

In a yet further embodiment, a wind power plant comprises a charging level detector for the energy storing unit. If the charging level of the energy storing unit drops below a certain charging level threshold, the wind power plant is brought to a halt in order to make sure that there is always enough energy for doing this in a controlled and safe manner. Thus it is always guaranteed that a standstill can be reached in a controlled way.

Figure 2:
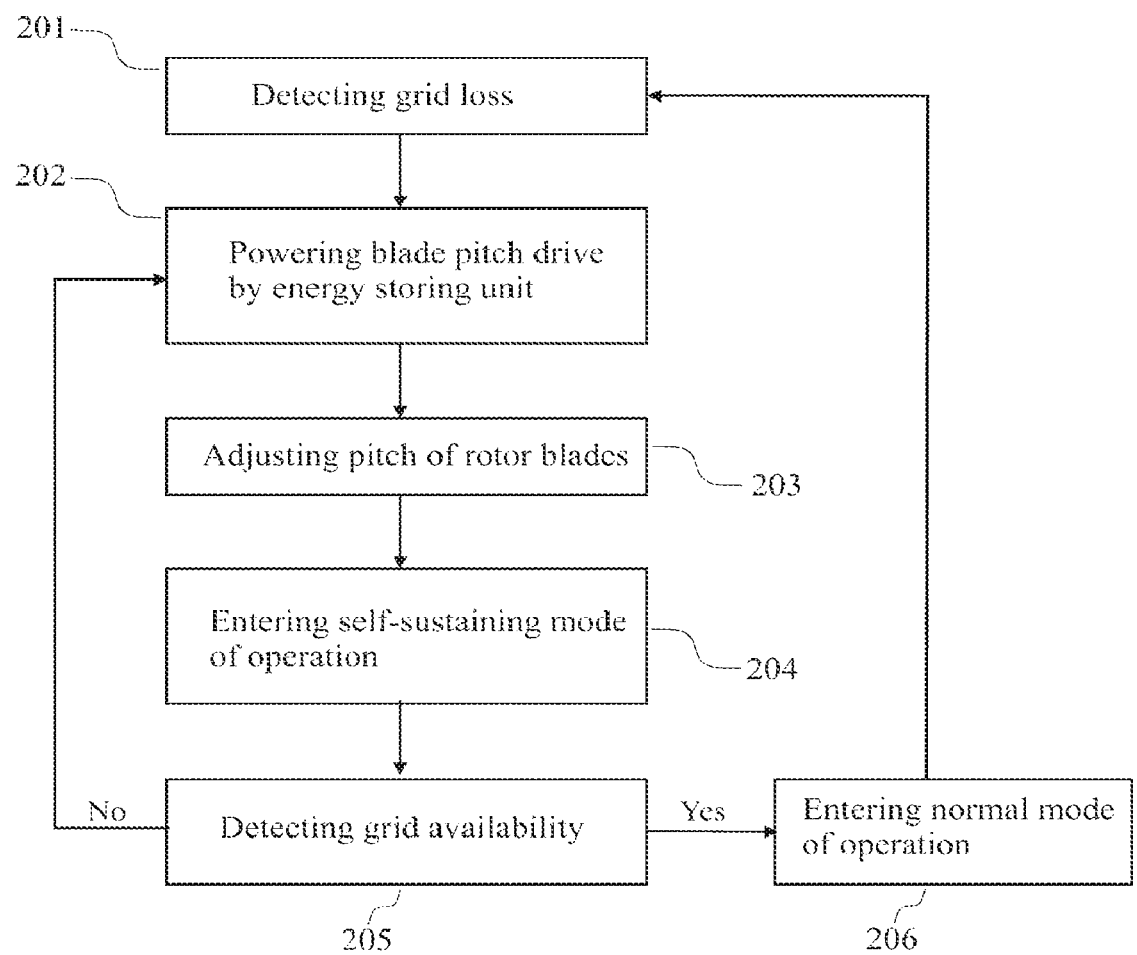
FIG. 2 shows a flow chart of a method of operating a wind power plant including a self-sustaining mode of operation.

FIG. 2 shows embodiments wherein methods of operating a wind power plant are provided. According to one embodiment, a method of operating a wind power plant is provided, the method comprising detecting a grid loss 201, powering a blade pitch drive by an energy storing unit 202, and adjusting the pitch of rotor blades 203 by means of the blade pitch drive. According to some embodiments, detecting of a grid loss is executed in a detector module. In further embodiments, the rotor blades either start rotating or maintain their rotation upon adjustment of the pitch of the rotor blades. In typical embodiments, the method further comprises entering a self-sustaining mode of operation 204. In further typical embodiments, the energy produced by the wind power plant, e.g. by means of an electric generator, is reduced upon adjustment of the pitch of the rotor blades and entrance into a self-sustaining mode of operation. In other embodiments, electric energy, e.g. produced in an electric generator of the wind power plant, recharges the energy storing unit.

As shown in FIG. 2, according to other embodiments, a method of operating a wind power plant further comprises detecting grid availability 205. In some embodiments, grid availability is detected in a detector module, in alternative embodiments, grid availability is detected in a switching module. In case the grid is not available, the method may further comprise maintaining the self-sustaining mode of operation 204. In other embodiments, the method may further comprise powering or re-powering of the blade pitch drive by the energy storing unit 202, adjusting or re-adjusting the pitch of the rotor blades 203, and entering, re-entering or maintaining the self-sustaining mode of operation 204. In case the grid is available, a method of operating a wind power plant further comprises entering or re-entering a normal mode of operation 206, yielding further embodiments. In some embodiments, entering normal mode is effected by a switching module of the wind power plant.

An embodiment relates to a method of operating a wind power plant during grid loss, wherein the wind power plant comprises a plurality of rotor blades, a blade pitch drive, a rotor shaft, an electric generator and an energy storing unit for powering the blade pitch drive, wherein the rotor blades are rotatably connected to the rotor shaft and the rotor shaft drives the electric generator. During a grid loss the method comprises the steps of powering the blade pitch drive with the energy storing unit and adjusting the pitch of the rotor blades such that the rotor starts rotating.

The steps of powering the blade pitch drive with the energy storing unit and adjusting the pitch of the rotor blades such that the rotor starts rotating make it possible to perform a so-called black start during a grid loss. By performing the black start the wind power plant resumes its power generating function without the support of the external grid. The black start helps the wind power plant to enter a self-sustaining mode so that the wind power plant has enough power to sustain as many basic functions such as security and safety functions as possible. Further to this, the purpose of the black start is to let the wind power plant resume its rotating movement so that the bearings are continuously provided with sufficient lubrication.

A further embodiment relates to a method of operating a wind power plant during grid loss, the wind power plant comprising a plurality of rotor blades, a blade pitch drive, a rotor shaft, an electric generator, and an energy storing unit for powering the blade pitch drive, wherein the rotor blades are rotatably connected to the rotor shaft and the rotor shaft drives the electric generator. During a grid loss, the method comprises the steps of powering the blade pitch drive with the energy storing unit and adjusting the pitch of the rotor blades such that the rotor shaft keeps rotating and the wind power plant is brought into a self-sustaining power generating mode.

In case of a grid loss, instead of bringing the wind power plant to a standstill, the pitch of the rotor blades is adjusted so that the rotor shaft keeps rotating. While the rotor is rotating at a sufficient high frequency, electric power may be generated for recharging the energy storing unit and for sustaining many or most if not all of the security and safety functions. The rotor blades are adjusted such that the generated power corresponds to the power that is consumed by the wind power plant.

In a further embodiment, the method comprises the step of generating electric energy with the electric generator and recharging the energy storing unit therewith.

In a yet further embodiment, the method comprises the steps of detecting the occurrence of a grid loss, and adjusting the pitch of the rotor blades for reducing the amount of energy being generated by the electric generator and entering a self-sustaining mode of operation.

In another embodiment, in case of grid loss and low wind speeds, the method comprises further the steps of detecting a current wind speed, comparing the wind speeds with a threshold and if the wind speed is above the threshold, adjusting the pitch of the rotor blades in order to enter the self-sustaining mode of the wind power plant. By that the wind power plant can perform a black start which supports lubrication of the bearings and helps providing at least part if not all security and safety functions. Security functions may comprise operating security lights and/or operating cooling systems in the wind power plant.

In yet another embodiment, the method comprises the step of measuring the charging level of the energy storing unit and stopping the rotation of the rotor shaft, when the charging level drops below a charging level threshold. This makes sure that the energy storing unit is always in possession of enough energy to perform a controlled power down with which the wind power plant is brought to a safe standstill.

In a further embodiment, the method comprises the step of powering down at least a portion of a control unit of the wind power plant, when the wind speed drops below a first wind speed threshold, and waking up the portion when the wind speed exceeds a second wind speed threshold. The second wind speed threshold can be equal or greater than the first wind speed threshold. By this measure, energy is saved during the time of low wind speeds and thus energy of the energy storing unit is saved.

What is claimed is:

1. A method of operating a wind power plant during grid loss, comprising:
    powering a blade pitch drive of the wind power plant by an energy storing unit; and
    adjusting the pitch of rotor blades of the wind power plant by means of the blade pitch drive,
    wherein a rotor shaft of the wind power plant starts rotating upon adjustment of the pitch of the rotor blades.

2. The method according to claim 1, further comprising:
    generating electric energy with an electric generator and recharging the energy storing unit therewith.

3. The method according to claim 1, further comprising:
    detecting the occurrence of grid loss;
    reducing the amount of energy being generated by an electric generator by adjusting the pitch of the rotor blades; and
    entering a self-sustaining mode of operation of the wind power plant.

4. The method according to claim 1, further comprising:
    detecting a current wind speed;
    comparing the wind speed with a threshold, and
    if the wind speed is above the threshold, entering a self-sustaining mode of the wind power plant by adjusting the pitch of the rotor blades.

5. The method according to claim 1, further comprising:
    measuring the charging level of the energy storing unit; and
    stopping the rotation of the rotor shaft, if the charging level drops below a charging level threshold.

6. The method according to claim 1, further comprising:
    powering down at least a portion of a control unit of the wind power plant if the wind speed drops below a first wind speed threshold; and
    waking up the portion if the wind speed exceeds a second wind speed threshold.

7. The method according to claim 1, wherein the rotor shaft is lubricated upon rotation.

\* \* \* \* \*